United States Patent [19]

McGarry et al.

[11] Patent Number: 5,000,981

[45] Date of Patent: Mar. 19, 1991

[54] COMPOSITIONS OF ELASTOMER-COATED FIBERS

[75] Inventors: Frederick J. McGarry, Weston, Mass.; Alan R. Siebert, Orange Village; Changkiu K. Riew, Akron, both of Ohio

[73] Assignee: The B. F. Goodrich Company, Akron, Ohio

[21] Appl. No.: 403,060

[22] Filed: Sep. 5, 1989

Related U.S. Application Data

[63] Continuation of Ser. No. 148,251, Jan. 25, 1988, abandoned.

[51] Int. Cl.$^5$ .......................... B05D 3/06; B05D 3/02
[52] U.S. Cl. ..................................... 427/44; 427/45.1; 427/54.1; 427/55; 427/386; 427/389.9
[58] Field of Search .................... 427/389.9, 35, 54.1, 427/55, 45.1, 386, 44

[56] References Cited

U.S. PATENT DOCUMENTS

| | | | |
|---|---|---|---|
| 4,239,563 | 12/1980 | Iacoviello | 427/389.9 |
| 4,256,809 | 3/1981 | Larrson et al. | 427/389.9 |
| 4,333,971 | 6/1982 | Van Eenam | 427/389.9 |
| 4,594,266 | 6/1986 | Lumaire et al. | 427/55 |
| 4,606,933 | 8/1986 | Griswold et al. | 427/55 |
| 4,737,386 | 4/1988 | Wotier et al. | 427/389.9 |
| 4,740,394 | 4/1988 | Mudge | 427/389.9 |
| 4,740,540 | 4/1988 | Kameda et al. | 427/386 |

OTHER PUBLICATIONS

Celanese Product Brochure, CMD WJ60-8537, Curing Agent; Aug., 1984.
"Mechanical Properties of Rubber Coated Fiberglass-/Epoxy Composites", paper by Christian Rogg, Jan. 24, 1988.
"Rubber Modified Graphite Fiber/Epoxy Laminates", Publication by Yoshihiro Sakamoto, Sep., 1987.

Primary Examiner—Janyce Bell
Attorney, Agent, or Firm—Debra L. Pawl; William A. Skinner; Nestor W. Shust

[57] ABSTRACT

Fibers are conveniently coated with a uniformly thin and continuous elastomeric coating by contacting the fibers with a (1) a water-dispersed reactive polymer, (2) epoxy resin, and (3) curing agent; and wherein said water-dispersed reactive polymer is a composition comprising. (a) a lower molecular weight reactive polymer, (b) a select solvent, (c) a dispersing agent, and (d) water. The elastomeric films have a Tg value of about 0° C. or below. The elastomer coated fibers are useful as strengtheners and impact modifiers for brittle materials such as epoxy resins.

11 Claims, 1 Drawing Sheet

COMPOSITIONS OF ELASTOMER-COATED FIBERS

This is a continuation of application Ser. No. 07/148,251, filed Jan. 25, 1988, now abandoned.

BACKGROUND

This invention relates to new compositions of elastomer-coated fibers and an improved process for preparing such from water-dispersed, reactive polymers. Polymers of lower molecular weight which are reactive are known in the art. For example, U.S. Pat. No. 4,133,957 describes amine-terminated liquid polymers represented by the formula

wherein Y is a univalent radical obtained by removing hydrogen from an amine group of an aliphatic, alicyclic, heterocyclic or aromatic amine containing at least two secondary or mixed primary and secondary amine groups with no more than one primary amine group per molecule, and "B" is a polymeric backbone comprising carbon-carbon linkages. Other amine-containing liquid polymers having carbon-carbon linkage backbones and their uses are described in U.S. Pat. No. 4,221,885. The B.F. Goodrich Company markets a line of reactive amine-terminated liquid polymers under the trademark Hycar ® liquid polymers.

Amine-containing polymers are also known which have carbon-oxygen linkages in the polymeric backbones. An example of this type of amine-containing liquid polymer is the polyether polyamines described in U.S. Pat. No. 3,436,359. Other examples of amine-containing liquid polymers having carbon-oxygen backbone linkages and their uses are described in U.S. Pat. Nos. 3,155,728; 3,236,895; 3,654,370; and 4,521,490. The '370 patent describes its amine-containing polymers as polyoxyalkylene polyamines. The '490 patent describes its amine-containing polymers as poly(oxyhydrocarbolene)diamines. The Jefferson Chemical Company subsidiary of Texaco, Inc. markets a line of amine-containing Polymers under the Trademark Jeffamine ® polyoxypropyleneamines.

Carboxyl-containing reactive polymers are also known in the art. For example, U.S. Pat. Nos. 3,235,589 and 3,285,949 describe carboxyl-terminated liquid polymers having a polymeric backbone comprising carbon-carbon linkages prepared by polymerizing dienes with or without vinyl nitriles and/or styrene in the presence of a bis-azocyanoalkyl acid initiator or an alkylene dicarboxylic acid peroxide. Carboxyl-containing polymers can also be prepared using the process described in U.S. Pat. No. 3,135,716 wherein monomers are polymerized using an organo-polyalkali metal compound to yield a polymer having a terminal alkali metal, and then post-reacting the polymer to form a terminal carboxyl group. The B.F. Goodrich Company markets a line of reactive carboxyl terminated liquid polymers under the trademark Hycar ® reactive liquid polymers.

Other types of lower molecular weight reactive polymer are also known. For example, U.S. Pat. No. 3,135,716 describes reactive polymers which can have mercaptan, hydroxyl, carboxyl and other groups. U.S. Pat. Nos. 4,120,766; 4,207,238; 4,238,397; 4,444,692; and 4,481,148 all describe hydroxyl-containing and hydroxyl-terminated liquid polymers. U.S. Pat. No. 3,770,698 describes phenol-terminated polymers. U.S. Pat. Nos. 3,910,992; 4,129,713; and 4,255,538 describe vinylidene-terminated polymers having carbon-carbon and carbon-oxygen backbone linkages. Other types of reactive, vinylidene-terminated liquid polymers having carbon-oxygen backbone linkages are described in U.S. Pat. No. RE 31,468. In some cases, the unsaturated group may not be terminally located but located internally as a vinylene group in the polymeric backbone. For example, liquid polybutadienes such as those made and marketed by ARCO; liquid EPDM polymers such as those marketed by Uniroyal Chemical Co. as Trilene ® 65, 66, and 67; and a liquid poly (butadiene-acrylonitrile) polymer sold by The B.F.Goodrich Co. as Hycar ® 1312 liquid polymer all contain reactive vinylene groups in the polymeric backbone. Lastly, mercaptan-terminated liquid polymers are described in U.S. Pat. Nos. 3,499,301 and 3,711,451.

The above polymers share some common characteristics. All are of lower molecular weight, ranging from about 200 to about 10,000 number average molecular weight. In many cases, the polymers are liquids at room temperature (about 25° C.). More importantly, all of the polymers are reactive, i.e. they can react, chain-extend, or cure with other chemicals, materials or polymers to form elastomeric or plastic solids. The above-referenced patents readily show and describe curing mechanisms and cure systems for the polymers. The reactive polymers can even co-cure with themselves as shown in U.S. Pat. No 4,058,657. Often, the material used as a curative for the reactive polymers is an epoxy resin. For example, in addition to the above-mentioned patents, U.S. Pat. Nos. 3,316,185; 4,018,847; 4,055,541; 4,088,708; 4,119,592; 4,260,700; and 4,320,047 all show cures of reactive polymers using epoxy resins and other curing agents.

The reactive polymers are useful as components in castable systems, as tougheners for epoxy and polYester resins in structural plastics, and in paints, coatings, sealants, adhesives, and the like.

The reactive polymers have been employed as impact or stress-fracture modifiers for brittle resins. In this work, they have been used in their pure liquid form or in the form of solvent solutions. An example of such work is described in the book published by the American Chemical Society entitled "*Rubber Modified Thermoset Resins*" as part of the Advances in Chemistry Series, No. 208, edited by C. Keith Riew and John K. Gillham. Another reference on this subject is the article published in the ACS periodical, *Rubber Chemistry and Technology*, entitled "Amine Terminated Reactive Liquid Polymers; Modification of Thermoset Resins" Vol. 54, No. 2, May-June 1981, by C. K. Riew.

The polymers can also be utilized in the form of a water-dispersion. One method that can be used to prepare water-dispersed compositions from liquid polymers involves mixing the polymer with water and soap using a high speed mixer such as an Eppenbach homogenizer or a Minisonic homogenizer. This process is not satisfactory as it introduces high levels of soap into the final composition.

A recent process has been developed to prepare water-dispersions of reactive polymers by first forming a "hydrophilic salt" of the polymer and then dispersing it in water. This process is described in copending application Ser. Nos. 134,385 and 134,412, filed on Dec. 17, 1987. This process can be readily used as described therein or with minor variations to form water-dispersed compositions of amine-containing and carboxyl-containing reactive polymers.

There have been attempts in the past at using reactive polymers in forming films or coatings on substrates. When these polymers are used in their pure liquid form, uniformly thin films are not readily obtained. If the reactive polymers are used in the form of organic solutions, uniformly thin and continuous films are also not conveniently obtained. Further, the organic solvents are employed at high levels, over 90% and up to 99.5% by weight of the solution, which causes environmental and safety problems.

Another method of forming films on fibers is by electrodeposition or electropolymerization. In this method, a conductive fiber or a fiber with a conductive coating thereon is placed into an electrolyte solution containing electropolymerizable monomers. A current is applied and the monomers polymerize onto the fiber surface. An example of such a process is described in the article in *Polymer Composites*, February 1987, Vol. 8, No. 1, entitled "Application of Ductile Polymeric Coatings Onto Graphite Fibers" by J. P. Bell et al. A disadvantage of such a process is that the fiber must be conductive and the monomers employed must be compatible with the technique; i.e. electropolymerizable and dispersible in an electrolyte solution.

Lastly, reactive polymers have been used as impact modifiers, not in a "bulk" manner but as an elastomeric film on a reinforcing fiber. This work was first done and described in a February, 1985 Thesis by J. K. Kawamoto et al entitled "Impact Resistance of Rubber Modified Carbon Fiber Composite" published by the School of Engineering, Mass. Institute of Technology. In the study, a dilute solution (0.5% to 5.0% by weight) of a carboxyl-terminated poly (butadiene-acrylonitrile) liquid polymer in xylene was used to coat carbon fibers, which were then used to prepare epoxy composites which were tested for their impact strength and other properties. Although the study demonstrated the concept, a better process to achieve more uniformly thin and continuous coatings on fibers is desired.

SUMMARY OF THE INVENTION

The invention comprises an improved method and process to prepare an elastomer-coated fiber, wherein the elastomeric coating is uniformly thin and continuous, by coating the fiber using a water-dispersed, reactive polymer composition. The elastomeric coating on the fiber has a glass transition temperature (Tg value) of about 0° C. or below.

DETAILED DESCRIPTION

Figure 1:
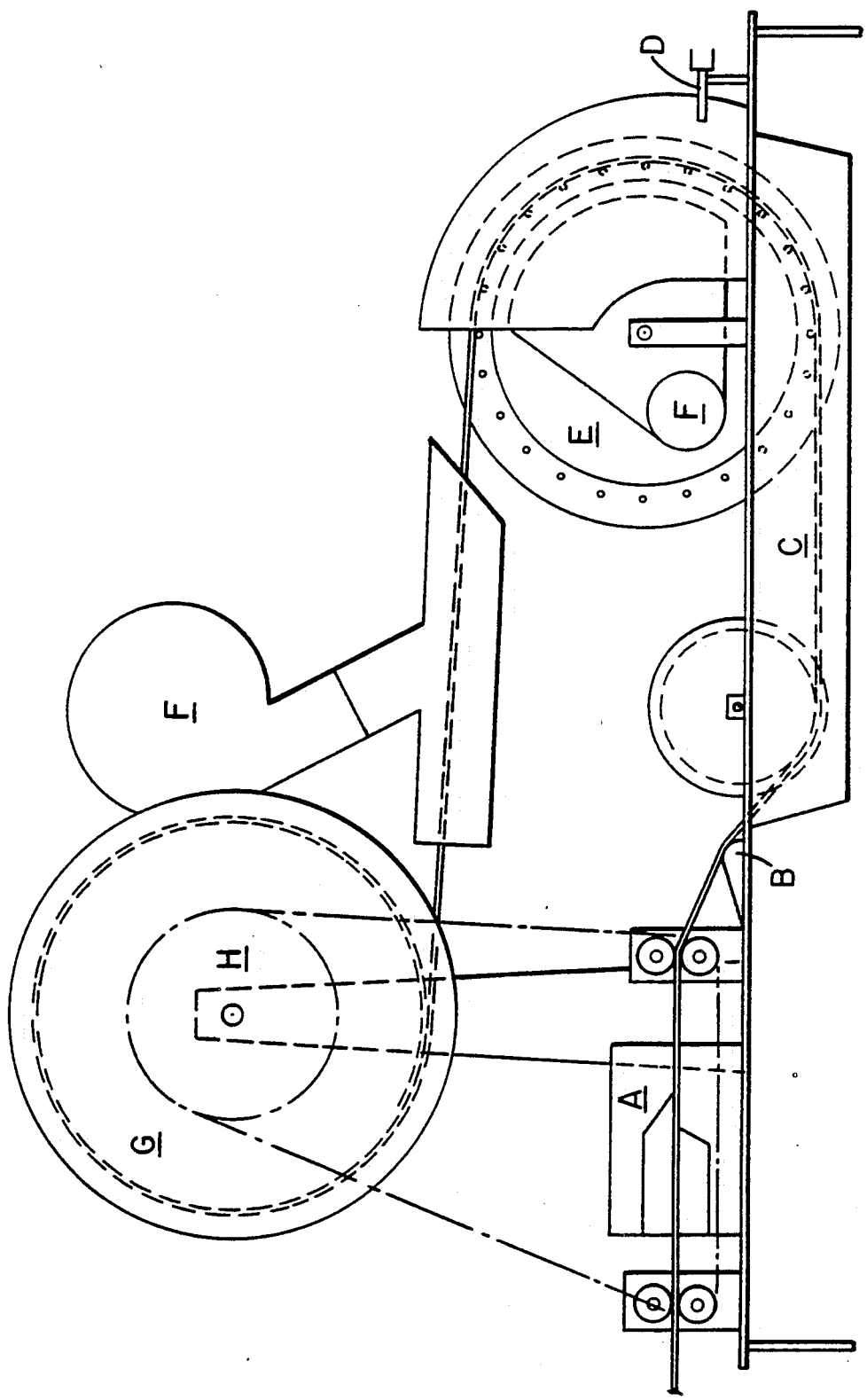
FIG. 1 shows a schematic of a method and process for coating fibers using a reactive polymer, water-dispersed composition, and drying and curing the reactive polymer to an elastomeric film.

The compositions of this invention comprise a fiber having a uniformly thin and continuous elastomeric coating thereon. The fibers employed can be any solid fiber. The types of fibers are described later in this specification. The elastomeric coating on the fiber is comprised of a cured reactive, lower molecular weight polymer. The main features of the reactive polymer are its ability to form a water-dispersed composition and to react to form an elastomer having a Tg value of about 0° C. or below.

Reactive polymers which are suitable for use in this invention can be represented by the following general formula:

$Y_n(PB)$ wherein Y is either a univalent, reactive radical selected from the group consisting of carboxyl groups, amine groups, mercaptan groups, hydroxyl groups, phenolic groups and vinylidene groups or a monomeric unit of the polymeric backbone; n is an integer from 1 to about 10; and PB is a polymeric backbone comprising carbon-carbon or carbon-oxygen linkages; provided that, when Y is a monomeric unit of the polymeric backbone that the polymeric backbone contains vinylidene groups. The reactive polymers have a number average molecular weight of from about 200 to about 10,000 measured using a Vapor Pressure Osmometer or a Gel Permeation Chromatograph technique; have a Tg value using a Differential Thermal Analysis technique of below 0° C.; and are liquids or low melting solids at ambient or room temperature (about 25° C.). Generally, the polymeric backbone linkages comprise at least about 70% by weight and more typically at least about 90% by weight of the total polymer, and the reactive groups comprise from a minimum of about 0.5% to about 10% or more by weight of the total polymer. The polymer can contain internal, pendant and/or terminal reactive groups, and can contain a mix of two or more reactive groups.

Amine-containing polymers are one type of reactive polymer such as referenced above. Examples of amine-containing liquid polymers having polymeric backbones comprising carbon-carbon linkages are described in U.S. Pat. No. 4,133,957, which description is hereby incorporated by reference. Such polymers are further described in U.S. Pat. No. 4,018,847. These polymers are readily prepared by the reaction of a carboxyl-containing liquid polymer with a diamine or by other methods adequately described in the above-mentioned patents.

Amine-containing polymers having polymeric backbones comprising carbon-oxygen linkages are prepared and described in U.S. Pat. Nos. 3,155,728; 3,436,359; and 3,654,370 which descriptions are hereby incorporated by reference. Such polymers are further disclosed in U.S. Pat. Nos. 3,316,185; and 4,521,490.

The method of preparing the amine-containing polymers is not critical to this invention. Any amine-containing polymers meeting the specifications stated herein can be formed into water-dispersed compositions and used in this invention using the method described herein.

The amine-containing polymers can have pendant amine groups (i.e., amine groups which are attached to the polymeric backbone as side groups) and/or terminal amine groups (i.e., amine groups which are attached to the ends of the polymeric backbone). The amine-terminated polymers can be mono-functional; i.e. having a primary or secondary amine group at one terminal end of the molecule, or di-functional; i.e. having a primary and/or secondary amine group at each terminal end of the molecule. Hence, the total amine functionality of the more preferred amine-terminated polymers can range from 1 to about 10 or more, but more preferably ranges from 1 to about 3 amine groups per molecule.

The amine-terminated polymers having carbon-oxygen linkages in the backbone may have a wider range of number average molecular weight than the amine-terminated liquid polymers having carbon-carbon backbones. For example, the Polyglycolamine polymer sold as Jeffamine ® polyoxypropyleneamine D-2000 has an average molecular weight of about 2000, and a viscosity of about 265 centipoises (measured at 25° C. using a Brookfield RVT viscometer with spindle No. 1 at 20 rpm). The polytetramethyleneoxide polymers sold by Minnesota Mining and Manufacturing are low-melting solids at room temperature and have viscosities of up to 100,000 cps at 65° C.

Carboxyl-containing liquid polymers are another type of reactive polymer useful in this invention. Examples of such polymers having polymeric backbones comprising carbon-carbon linkages are described in U.S. Pat. Nos. 3,285,949 and 3,235,589, which descriptions are hereby incorporated by reference. Such polymers are further described in U.S. Pat. No. 4,119,592. These polymers are readily prepared by the reaction of vinylidene-containing monomers in the presence of a bis-azocyano acid such as azodicyanovaleric acid or by other methods adequately described in U.S. Pat. Nos. 3,135,716 and 3,235,589. The method of preparing the carboxyl-containing liquid polymer is not critical to this invention. Any carboxyl-containing liquid polymers meeting the specifications stated herein can be formed into water-dispersed compositions and used in this invention using the method disclosed herein.

The carboxyl-containing liquid polymers can have pendant carboxyl groups (i.e., carboxyl groups which are attached to the polymeric backbone as side groups) and/or terminal carboxyl groups (i.e., carboxyl groups which are attached to the ends of the polymeric backbone). The carboxyl-terminated liquid polymers can be mono-functional; i.e. having a carboxyl group at one terminal end of the molecule, or di-functional; i.e. having a carboxyl group at each terminal end of the molecule. Also, the mono-functional or di-functional polymer can contain pendant carboxyl groups. Hence, the total carboxyl functionality of the more preferred carboxyl-terminated liquid polymers can range from 1 to about 10 or more, but more preferably ranges from 1 to about 3 carboxyl groups per molecule.

Examples of other types of reactive polymers which can be employed in this invention are the hydroxyl-containing liquid polymers described in U.S. Pat. Nos. 4,120,766; 4,238,397; 4,444,692; and 4,481,148. Also, phenolic-containing liquid polymers such as described in U.S. Pat. No. 3,770,698; vinylidene-terminated liquid polymers such as described in U.S. Pat. Nos. 3,910,992; 4,129,713; 4,255,538; and RE. 31,468; and mercaptan-terminated liquid polymers described in U.S. Pat. Nos. 3,499,301 and 3,711,451, are all useful in this invention. Lastly, reactive polymers containing internal vinylene unsaturation such as liquid polybutadiene and liquid EPDM polymers are also useful in this invention.

If the reactive polymers have polymeric backbones comprised of carbon-carbon linkages, the preferred polymeric backbone is derived from interpolymerization of vinylidene monomers. Examples of vinylidene monomers are (a) monoolefins containing 2 to 14 carbon atoms, more preferably 2 to 8 carbon atoms, such as ethylene, propylene, isobutylene, 1-butene, 1-pentene, 1-hexene, 1-heptene, and the like; (b) dienes containing 4 to 10 carbon atoms, more preferably 4 to 8 carbon atoms, such as butadiene, isoprene (2-methyl-1,3-butadiene), 2-isopropyl-1,3-butadiene, chloroprene (2-chloro-,3-butadiene), and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like, and (e) acrylates having the formula

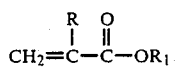

wherein R is hydrogen or an alkyl radical containing 1 to 3 carbon atoms, such as methyl, ethyl, propyl, and isopropyl, and R1 is an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, octyl methacrylate, and the like. Often two or more types of these polymerized monomeric units are contained in the polymeric backbone.

The vinylidene monomers described above may be readily polymerized with up to about 50% by weight and more preferably up to about 35% by weight of at least one comonomer selected from the group consisting of (f) vinyl aromatics having the formula

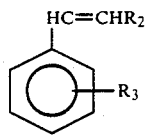

wherein $R_2$ is hydrogen or methyl and $R_3$ is hydrogen, halogen or an alkyl radical containing from 1 to 4 carbon atoms, such as styrene, α-methyl styrene, chlorostyrene, vinyl toluene, and the like; (g) vinyl nitriles having the formula

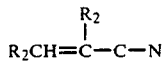

such as acrylonitrile and methacrylonitrile; (h) vinyl halides such as vinyl bromide, vinyl chloride, and the like; (i) vinyl acids such as acrylic acid, methacrylic acid, and itaconic acid; (j) divinyls and diacrylates such as divinyl benzene, divinyl ether, diethylene glycol diacrylate, and the like; (k) amines of α,β-olefinically unsaturated carboxylic acids containing 2 to 8 carbon atoms such as acrylamide, and the like; and (l) allyl alcohol, and the like. Liquid polymer compositions having polymeric backbone derived from polymerized units of a major amount of at least one vinylidene monomer listed in (a) to (e) with a minor amount of at least one comonomer listed in (f) to (l) are within the scope of this invention.

The choice of the vinylidene monomers interpolymerized into the polymeric backbone is such that the Tg of the reactive polymer is below 0° C. The Tg value of a homo- or interpolymer is readily determinable by Differential Thermal Analysis, or it can be calculated from knowledge of the Tg of the homopolymer of the individual monomers. An equation for calculating the Tg of copolymers is given on page 27 of the book "*Mechanical Properties of High Polymers*" by L. E. Neilsen, published by Reinhold Publishing Corp., 1967. The Tg value of many homopolymers ar listed in the Tables given in Chapter 2 of the book.

Examples of interpolymerized polymeric backbones of carbon-carbon linkages obtained from interpolymerization of vinylidene monomers include polyethylene, polyisobutylene, polyisoprene, polybutadiene, poly(vinyl ethyl ether), poly(ethylacrylate) and poly (butylacrylate) as well as polymers of butadiene and acrylonitrile; butadiene and styrene; butadiene, acrylonitrile, and acrylic acid; vinyl acetate and isoprene; vinyl acetate and chloroprene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and acrylic acid; ethyl acrylate and acrylamide; butyl acrylate and styrene; butyl acrylate and acrylonitrile; butyl acrylate and vinyl chloride, and the like.

The most preferred reactive polymers are the amine-terminated and carboxyl-terminated polymers having polymeric backbones comprised of carbon-carbon linkages derived from interpolymerized units of from about 50% to about 99.6% by weight of a diene such as isoprene or butadiene, and up to about 40% by weight of a vinyl nitrile such as acrylonitrile or a vinyl aromatic such as styrene, and up to 10% by weight of a vinyl acid such as acrylic acid, and having a carboxyl or amine content of from about 0.4% to about 10% by weight, all weights based upon the total weight of the polymer. These polymers have a number average molecular weight of from about 1000 to about 5000, and a viscosity of from about 1000 to about 500,000 centipoises (measured at 27° C. using a Brookfield RVT viscometer with spindle no. 7 at 20 rpm).

The reactive polymers are used in this invention in the form of a water dispersion. The water dispersed compositions comprise the reactive polymer, a select solvent, a dispersing agent, and water.

The solvent used to prepare the water dispersed compositions requires the unusual property of being both water and organic soluble, that is having a balanced hydrophobic-hydrophilic character. Example of solvents having the above described properties include the glycol ethers such as 2-propoxy-1-methyl ethanol, 2-propoxyethanol and 2-butoxy ethanol which is commercially known as butyl Cellosolve.

The solvent is used in the composition at a level of at least about 10 parts by weight based on 100 parts by weight of the polymer. When less than about 10 parts of solvent is used with 100 parts by weight of polymer, the product composition is typically unstable and exhibits two phases. More preferably, the solvent is used in the range of about 50 to about 500 parts by weight based on 100 parts by weight of the polymer. The upper amount of solvent used is limited basically by practical considerations. Excellent compositions were obtained when employing about 100 parts by weight of the solvent per 100 parts by weight of the reactive polymer.

The third ingredient of the reactive polymer, water dispersed composition is a dispersing agent. This material is an acidic or basic material, as further described herein, which is capable of interacting with the reactive polymer to form a compound which has both a hydrophilic and hydrophobic character. The dispersing agent is not a traditional soap. The use of these traditional soaps would cause interfacial and adhesion problems between the reactive polymer and the fiber, and, being hydroscopic in nature, would introduce water at the reactive polymer-fiber interfacial bond.

The acidic or basic material interacts with the reactive polymer, typically with the functional reactive group, to form a "salt". Examples of acidic dispersing agents are organic acids. The organic acid can interact with a basic functional group, such as with an amine group to form a hydrophilic salt. The preferred organic acids are short chain organic acids represented by the formula

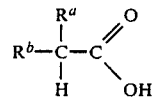

where $R^a$ is a straight or branched chain alkyl group containing from about 1 to about 9 carbon atoms, and $R^b$ is hydrogen, a hydroxyl group or a halogen. The most preferred organic acids are those of the above formula wherein $R^a$ is 1 to 4 carbon alkyl group such as a methyl or ethyl group, and $R^b$ is a hydroxyl group. Excellent results were obtained when the organic acid used was lactic acid.

The amount of organic acid employed is determined by the stoichiometry relationship of the acid per 1.0 amine (base) equivalent. The amine equivalent weight (AEW) of the reactive polymer is calculated as 100 divided by the equivalents per hundred parts by weight of rubber of the amine-containing polymer. An amine-containing polymer can be solubilized using as low as about 0.8 carboxyl equivalents of organic acid per 1.0 amine equivalent. However, better dispersion is obtained when about 1.0 carboxyl equivalent of organic acid per 1 0 amine equivalent is used, although up to a 20% excess can be readily employed without problems. The upper level of organic acid used is basically limited by practical considerations.

Examples of basic dispersing agents are inorganic or organic bases. This material interacts with an acidic functional group, such as a carboxyl group, to form a hydrophilic salt. ExamPles of inorganic bases are sodium hydroxide, potassium hydroxide, and metal alcoholates such as sodium ethoxide. More preferably the base is an organic amine, preferably a tertiary amine. Examples of these amines are trimethylamine, triethylamine, triisopropyl amine, dimethylbutyl amine, dimethylbenzyl amine, methyldiphenYl amine, triethanol amine, N-methyl peperidine, N-methyl morpholine, triethylenediamine, pyridine, 4,4'-dipyridyl propane, 2,4,6-tri (dimethylaminomethyl) phenol, and the like.

Excellent results were obtained when the organic base used was dimethylaminoethanol.

The amount of organic base employed is determined by the stoichiometry relationship of the base per 1.0 carboxyl equivalent. The carboxyl (acid) equivalent weight is calculated as 100 divided by the equivalents per hundred parts by weight of rubber of the carboxyl-containing polymer. A carboxyl-containing polymer can be solubilized using as low as about 0.8 equivalents of base per 1.0 carboxyl equivalent. However, better dispersion is obtained when about 1.0 equivalent of base per 1.0 carboxyl equivalent is used, although up to a 20% excess can be readily employed without problems. The upper level of base used is basically limited by practical considerations.

Water is the fourth ingredient in the compositions. The water used can be distilled water, demineralized water, or regular tap water. The amount of water used in preparing the composition is at least about 50 parts by weight per 100 parts by weight of the polymer. More preferably, the amount of water employed is from about 100 parts to about 600 parts of water per 100 parts of the polymer. Excellent results were obtained using about 500 parts by weight of water per 100 parts by weight of reactive polymer.

Water dispersed compositions of amine-containing reactive polymers were readily formed comprising (1) 100 parts by weight of an amine-containing polymer, (2) at least 25 parts by weight of the select solvent, (3) at least about 0.8 equivalent of an organic acid, and (4) at least about 100 parts by weight of water.

The water-dispersed, reactive polymer compositions can be prepared by admixing all four components together. However, the preferred method is to first dissolve the polymer in the solvent. The dissolution of the polymer in the organic solvent is enhanced by mild heating and agitation with, for example, a propeller type mixer operating at about 50 to about 300 rpm. Thereafter, the dispersing agent is added to the solvent solution of the liquid polymer with mild agitation. Finally, the water is added slowly with mild agitation to yield a suspension of the polymer in the water. No soap is used to prepare the water-dispersed compositions.

The water-dispersed, reactive polymer compositions are typically "transparent" dispersions as opposed to the milky, opaque appearance of latexes.

The water-dispersed reactive polymer compositions can be used to coat fibers in the form they are prepared. However, it is advantageous to dilute the compositions with additional water and use them in the form of a dispersion containing about a 0.1% to about 5% by weight of reactive polymer. More preferably, the compositions are used in the form of water dispersions containing about 0.25% to about 2% by weight of reactive polymer.

The use of the water-dispersed compositions described herein have a substantial advantage over the use of a latex or a solvent solution in that the water dispersions can be diluted down to very low levels of total solids and yet remain stable for use. Latexes are typically high solids dispersions, and attempts to dilute them down to low levels usually result in instability of the system and coagulation. Further, latexes typically employ high levels of traditional soaps which is undesirable. With solvent solutions, although a low total solids level can be obtained, the use of large levels of solvent is undesirable.

The fibers employed in this invention can be any solid synthetic or natural fiber. Examples of such fibers are glass fibers, graphite fibers, and asbestos fibers; natural organic fibers such as wool and cotton; and synthetic fibers such as polyaramide fibers, polyester fibers, nylon fibers, and polyolefin fibers such as polyethylene and polybutylene fibers. Since one of the primary uses of the water dispersed, reactive polymer compositions is to provide impact modification of brittle substances, the preferred fibers to coat with the reactive polymers are those fibers which are used as strengthening materials for such substances. Hence, glass fibers and graphite fibers would represent the large volume fibers typically used in these applications. Of all of the fibers, the glass fibers are the most preferred type of fiber used in this invention.

Other processes may be used to provide a thin and continuous elastomeric coating on the fibers. For example, the work done by J. K. Kawamoto et al, described in the thesis referenced on page 6 hereof, showed that thin and continuous films on graphite fiber may be achieved using solvent solutions of a reactive polymer and working under exacting conditions. Also, the work done by J. P Bell et al, described in the ACS article referenced on page 5 hereof, showed that thin and continuous films on graphite fiber could be achieved using electropolymerization techniques and employing a monomeric electrolyte solution. However, these processes are not entirely satisfactory. The present process of coating fibers using the water-dispersed, reactive polymer compositions described above results in excellent uniformly thin and continuous elastomeric coatings on fibers. By thin is meant a film coating of up to about 0.2 micron in thickness and having a ratio of film thickness to diameter of the fiber of no more than 1:10 and preferably of 1:50 or less. When the film thickness to fiber diameter ratio is greater than 1:10, the reinforcing effectiveness of the fiber is seriously impaired by the compliance of the elastomeric film.

A preferred process used to coat the fibers is to draw the fibers through the water-dispersed, reactive polymer composition, while simultaneously or subsequently adding the necessary curative ingredients, and then drying and curing the coating to an elastomeric film. The preferred process is further described as follows using an amine-terminated liquid polymer as an exemplary reactive polymer.

A water-dispersed composition of an amine-terminated liquid polymer having a poly (butadiene-acrylonitrile) backbone is first formed by dissolving the polymer in a select solvent such as butyl Cellosolve, adding an organic acid such as lactic acid, followed by the addition of water. The curative ingredients for amine-terminated liquid polymers are well known and are clearly described in U.S. Pat. Nos. 4,018,847; 4,055,541; and 4,521,490. The curative ingredients, i.e. the epoxy resin and curing agent, are themselves water-dispersible, and can be used in this form. Hence, all three water dispersions can be admixed and used simultaneously.

The strand, for example graphite or glass, is separated into individual fibers and drawn through the water dispersion mix. The coated fiber is then dried and the reactive polymer cured to an elastomeric film. The curatives and their levels of use with a reactive polymer to produce a cured, elastomeric state is well known to the art. The most common curative used is an epoxy resin such as the aliphatic and cycloaliphatic epoxides and the diglycidylethers of Bisphenol A. Curing agents which can be employed in these systems include aliphatic and aromatic amines, polyamides, and dicyandiamides. Reactive polymers containing internal vinylene groups can be cured using free-radical peroxides and hydroperoxides.

As an example of the above, it is well known in the art that amine-containing liquid polymers can be cured using epoxy resins and/or hardeners as curatives. The ratio of these ingredients to the reactive polymer determines the physical properties of the cured elastomer. For example, using a recipe of 100 parts by weight of epoxy resin (a digylcidyl ether of Bisphenol A) and 24 parts by weight of a chain extender (Bisphenol A) with varying weights of a Hycar ATBN liquid polymer as hardener, a poly (Butadiene-16% acrylonitrile) liquid polymer having terminal amine groups and an AEW of 900, the following results were obtained after cure for 16 hours at 120° C.

|  | Parts by Weight | | | |
| --- | --- | --- | --- | --- |
| Epoxy Resin | 100 | 100 | 100 | 100 |
| Bisphenol A | 24 | 24 | 24 | 24 |
| Hycar ATBN | 150 | 250 | 300 | 400 |
| Tensile, psi | 2020 | 1280 | 1040 | 800 |
| Elongation, % | 70 | 150 | 180 | 260 |

The amine-containing liquid polymers can also be cured using 100 parts by weight of a cycloaliphatic cycloaliphatic diepoxide as the epoxy resin and 100 parts by weight of hexahydrophthalic anhydride as the hardener with similar results. Of course, other typical ingredients such as plasticizers, fillers, pigments, stabilizers and the like can also be used with the reactive polymers.

The cure of carboxyl-containing liquid polymers is also well known to the art. For example, U.S. Pat. No. 4,119,592 shows the cure of Hycar CTBN using various epoxy resins, amine curatives, and dihydric compounds to yield cured elastomeric products. The ratio of reactive polymer to epoxy resin employed has a pronounced effect on tensile and elongation properties of the cured elastomer.

The reactive polymers, especially those which contain carbon-carbon unsaturation, can also be conveniently cured using radiation. For example, ultraviolet radiation in the presence of UV sensitizers, infrared radiation in the presence of thermal reactive agents, microwave radiation, and electron-beam radiation can all be employed to cure the reactive polymer to an elastomeric coating.

A preferred technique and an apparatus for coating the fibers is shown in FIG. 1. Using this technique, the strand, prior to entering the coating chamber, is separated into individual fibers by an air jet. The fibers are drawn through the compositions in the chamber at a set rate. The coated fiber is then passed through a drying region and a curing region. The drying is effected at a temperature and for a time sufficient to evaporate the solvent and water. Drying can be accomplished using a hot gas stream such as heated air or in a vacuum, at temperatures of from about 50° C. to about 120° C. for about 10 seconds to 60 seconds or more. Curing times and temperatures depend upon the type of curing mechanism and type of curative ingredients employed. Typically, curing times range from about thirty seconds to 60 minutes or more at temperatures of about 50° C. to about 150° C. The drying region and curing region can be part of the same continuous area.

The fibers can be drawn through a common or consecutive baths. The curatives can be used in the form of water dispersions or solvent solutions. The fiber can be used as acquired, or cleaned and/or pre-treated prior to coating with the reactive polymer. If the fibers and reactive polymers do not themselves form a strong interfacial bond, the fibers can be pre-treated using known sizings to promote effective bonding between the fiber and the reactive polymer elastomeric film. It is important that the individual fibers have good and sufficient contact with the reactive polymer and curatives, and that the coated fibers are dried and at least partially cured to a non-blocking state prior to contact with each other.

The following examples illustrate the invention described herein. The examples are not to be construed as limiting in any way the scope of the invention.

PREPARATION OF REACTIVE POLYMER WATER DISPERSIONS

EXAMPLE 1

A series of experiments were run using an amine-terminated liquid polymer commercially available from The B.F. Goodrich Company and marketed as Hycar® ATBN 1300×16. The polymer has a polymeric backbone of interpolymerized butadiene and about 16% by weight of acrylonitrile, has a Brookfield viscosity of 200,000 cps at 27° C. (81° F.), and has an amine equivalent weight of about 900. The lactic acid used in the example has a carboxyl equivalent weight of 90. The components used in the recipes below are shown in parts by weight.

|  | 1 | 2 |
| --- | --- | --- |
| ATBN (1300 × 16) | 20 | 20 |
| Butyl Cellosolve | 20 | 10 |
| Lactic Acid (85% in water) | 3 | 3 |
| Water | 100 | 100 |
| Appearance | Translucent and Stable | Opaque and Stable |

The compositions were prepared by dissolving the ATBN liquid polymer in the butyl Cellosolve at a temperature of about 25° C. followed by addition of the lactic acid. Water was then slowly added to the compositions while agitating the mixture at 50 to 300 rpm using an air stirrer with a marine blade.

EXAMPLE 2

The above experiment was repeated using other amine-terminated liquid polymers. The polymers are described as follows: AT-RLP-1 has a polybutadiene backbone, a Brookfield viscosity of 127,000 cps. at 27° C., and an amine equivalent weight of 1050; AT-RLP-2 has a backbone of interpolymerized butadiene and acrylonitrile (about 10% by weight), a viscosity of 180,000 cps., and an amine equivalent weight of 1200; and AT-RLP-3 has a backbone of interpolymerized butadiene, acrylonitrile (about 16% by weight), and acrylic acid (about 1.7% by weight) which carboxyl groups were converted to amine groups using the teachings of U.S. Pat. No. 4,133,957, a viscosity of 460,000 cps, and an amine equivalent of about 800. The components used in the recipes below are shown in parts by weight.

|  | 1 | 2 | 3 |
| --- | --- | --- | --- |
| AT-RLP-1 | 20 | — | — |
| AT-RLP-2 | — | 20 | — |
| AT-RLP-3 | — | — | 20 |
| Butyl Cellosolve | 20 | 20 | 20 |
| Lactic Acid | 3 | 3 | 3 |
| Water | 100 | 100 | 100 |
| Appearance | Translucent and Stable | Translucent and Stable | Translucent and Stable |

EXAMPLE 3

The experiment in Example 2 above was essentially repeated using a mono-functional amine-terminated liquid polymer having a polymeric backbone comprised of interpolymerized butadiene and acrylonitrile (about 16% by weight). The amine-terminated polymer has a viscosity of 64,000 cps. and an amine equivalent weight of 2500. The recipe used was 10 parts by weight of polymer, 10 parts by weight of butyl Cellosolve, 1.5 parts by weight of lactic acid, and 50 parts by weight of water. A stable, translucent composition was readily prepared.

EXAMPLE 4

The above experiment was essentially repeated using an amine-containing liquid polymer having a polymeric backbone comprised of carbon-oxygen linkages. The amine-terminated polyether used is known as D-2000, which is commercially available from Texaco, Inc. through its Jefferson Chemical Co. subsidiary. The polymer is a polyoxypropyleneamine which has an average molecular weight of about 2000, a viscosity of about 265 centipoises at 25° C., and an amine equivalent weight of 1040. The recipe used was 20 parts by weight of D-2000, 20 parts by weight of butyl Cellosolve, 3 parts by weight of lactic acid and 100 parts by weight of water. A stable, translucent composition was readily prepared.

EXAMPLE 5

The experiment in Example 4 above was repeated using another amine-containing polymer having a higher molecular weight and a polymeric backbone comprised of carbon-oxygen linkages. The amine-terminated polymer used is known as HC-1101, which is commercially available from The 3M Co. The polymer has an average molecular weight of 10,000, and an amine equivalent weight of 4610. The polymer is a low-melting solid at room temperature. Hence, the polymer was heated to about 50° C. and used in a liquid state. The recipe used was 10 parts by weight of HC-1101, 10 parts by weight of butyl Cellosolve, 1.5 parts by weight of lactic acid and 50 parts by weight of water. A stable, translucent composition was readily prepared.

EXAMPLE 6

Carboxyl-terminated liquid polymers commercially available from the B.F. Goodrich Company marketed as Hycar* CTBN were used to prepare water-dispersed, carboxyl-containing liquid polymer compositions of this invention.

The compositions were prepared by dissolving the CTBN liquid polymer in the solvent, butyl Cellosolve, at a temperature of about 25° C. followed by addition of the respective base. Water was then slowly added to the compositions while agitating the mixture at 50–300 rpm using an air stirrer with a marine blade. The CTBN polymers are described as follows: CT-RLP-1 has a backbone of interpolymerized units of butadiene and acrylonitrile (about 10% by weight), a Brookfield viscosity of 60,000 cps. at 27° C., and a carboxyl equivalent weight of about 2000; CT-RLP-2 has a backbone of interpolymerized butadiene and acrylonitrile (about 18% by weight), a viscosity of 135,000 cps., and a carboxyl equivalent weight of 1920; and CT-RLP-3 has a backbone of interpolymerized butadiene and acrylonitrile (25% by weight), a viscosity of 500,000 cps, and a carboxyl equivalent weight of 1750. The organic base was used in the example at 1.0 equivalent per 1.0 carboxyl equivalent. The components used in the recipes below are shown in parts by weight.

|  | 1 | 2 | 3 | 4 | 5 | 6 |
| --- | --- | --- | --- | --- | --- | --- |
| CT-RLP-1 | 20 | — | — | — | — | — |
| CT-RLP-2 | — | 20 | — | 20 | 20 | 20 |
| CT-RLP-3 | — | — | 20 | — | — | — |
| Butyl Cellosolve | 20 | 20 | 20 | 20 | 20 | 20 |
| Dimethylaminoethanol | 1 | 1 | 1 | — | — | — |
| Imidazole | — | — | — | 0.7 | — | — |
| 2-Methyl Imidazole | — | — | — | — | 0.8 | — |
| 2-Methyl-4-Ethyl Imidazole | — | — | — | — | — | 1.1 |
| Water | 100 | 100 | 100 | 100 | 100, | 100 |

All of the compositions were stable and translucent.

EXAMPLE 7

The experiment in Example 6 above was essentially repeated using a carboxyl-terminated polymer having a polymeric backbone comprised of interpolymerized butadiene. The polymer has a viscosity of 60,000 cps. and a carboxyl equivalent weight of 2220. The recipe used was 20 parts by weight of polymer, 20 parts by weight of butyl Cellosolve, 1 part by weight of dimethylaminoethanol and 100 parts by weight of water. A stable, translucent composition was readily prepared.

EXAMPLE 8

The above experiment was essentially repeated using a carboxyl-containing polymer having a polymeric backbone comprised of interpolymerized units of butadiene, acrylonitrile (about 18% by weight), and acrylic acid (1.7% by weight). The polymer has both terminal and pendant carboxyl groups. The polymer has an average molecular weight of about 3600, a viscosity of about 160,000 centipoises at 27° C., and a carboxyl equivalent weight of about 1490. The recipe used was 20 parts by weight of polymer, 20 parts by weight of butyl Cellosolve, 1 part by weight of dimethylaminoethanol and 100 parts by weight of water. A stable, translucent composition was readily prepared.

COATING OF FIBERS

EXAMPLE 9

A water-dispersed composition prepared as in Example 1 was used to coat a carbon-graphite fiber. The reactive polymer employed was an amine-terminated liquid poly (butadiene-acrylonitrile) polymer as described in Example 1. The curatives employed were a bisphenol A type epoxy resin having an epoxy equivalent weight of 525 sold as Epi-Rez 520-C, and available in a water-dispersed form as CMD WJ 55-3520 Epoxy Resin from Interez, Inc. (the epoxy resin was dispersed in water and 2-propoxyethanol); and an amine curing agent having an amine equivalent weight of 174, and available in water-dispersed form as CMD WJ60-8537 Curing Agent from Interez, Inc. (the amine was dispersed in water, 2-propoxyethanol, and glacial acetic acid). The water dispersions were compatible with each other and were admixed in a common coating pan. The fiber employed was a carbon-graphite fiber available as Thornel 300 from Amoco Performance Products, Inc.

The graphite fiber was first cleaned by soaking it in acetone for about 24 hours. The fiber roving was then placed on a reel and passed over an air jet to separate the individual filaments. The separate filaments were then drawn through a pretreatment solution of 0.1% epoxy resin (Epon 828) and Ancamine K-61B amine curative (10% by weight based on the epoxy) dissolved in a 50/50 mixture of acetone and methylethyl ketone. This was a sizing solution used to promote adhesion of the reactive polymer to the fiber. The sizing was dried and cured to the fiber.

The treated fiber was then drawn through the three component water-dispersed mixture described above. The coated fiber was dried in a hot air stream and then cured at 120° C. for 2 hours.

Four different concentrations of the reactive polymer in water dispersion were evaluated; i.e. 0.5%, 1.0%, 2.0%, and 3.0% by weight of polymer. The thickness of the polymer film coated on the fiber was proportionate to the concentration of the polymer in the dispersion, and was calculated to be 0.010, 0.036, 0.062, and 0.114 micron in thickness, respectively. The coating, after cure, was immersed in acetone to establish that the reactive polymer was in fact in a cured state. Pictures taken by scanning electron microscopy showed the elastomeric coatings to be uniformly thin and continuous. The ratio of the thickness of the film to fiber diameter (7 microns) ranged from about 1:700 to about 1:50.

EXAMPLE 10

The process described in Example 9 was repeated using a glass fiber. The same reactive polymer, water-dispersed composition, and epoxy and amine curatives were employed at the same conditions. However, in this experiment, the fiber was not cleaned and pretreated prior to use, but was used as received. The glass fiber employed was Type E glass fiber sold as OCF Roving 366 Fiberglass by Owens Corning Fiberglas Co. The fiber had a diameter of 16 microns.

The reactive polymer and curatives were used as water-dispersions and commonly placed into the coating chamber. The glass fibers were drawn through the chamber, passed through a drying section and then heated at 120° C. for 2 hours to cure the reactive polymer to an elastomeric film. Again, the state of cure was demonstrated by immersing a portion of the coated fiber in acetone and methylethyl ketone for one hour. The coating thickness was calculated to be 0.041, 0.105, and to 0.192 micron in thickness, respectively, depending in proportion on the concentration of the reactive polymer in the water dispersions (1%, 2%, and 3% by weight).

USE OF ELASTOMER COATED FIBERS AS IMPACT MODIFIERS IN EPOXY MATRICES

EXAMPLE 11

Cured epoxy laminates were prepared which contained the elastomer-coated graphite fibers prepared in Example 9. These laminates were fabricated as follows. A prepreg was first prepared by contacting the coated fiber in an epoxy resin solution mix of 100 parts by weight of Epon 828 (a diglycidylether of Biphenol A), 10 parts by weight of Ancamine K61B (an amine curing agent of tris-(dimethyl-aminomethyl) phenol-tri (2-ethyl hexoate), and 70 parts by weight each of acetone and MEK. The fiber was wound at 32 strands per inch on an aluminum plate which was immersed in the above described epoxy resin solution for about one minute, then dried. The prepreg was then heated at 120° C. for about 3 minutes to cause partial curing of the epoxy resin matrix. These were then used to form 8 ply unidirectional and crossply laminates, which were cured between plates for 2 hours at 177° C. These laminates were tested against laminates similarly prepared but made using graphite fibers having no elastomeric coating thereon.

Tests were made on samples for short beam shear, end-notched flexural interlaminar shear, and single edge-notched intralaminar shear. In these tests, failure occurred at the fiber/epoxy matrix interface when the ordinary graphite fibers were used, but occurred at the elastomer/epoxy matrix interface (or in the elastomer coating per se) when the elastomer coated graphite fibers were used, indicating excellent bonding between the graphite elastomer interface. The use of the elastomer coated fiber resulted in a significant increase in shear toughness of the laminate. Further, the use of the elastomer coated graphite fibers resulted in greater impact energy being absorbed in the samples in impact tests.

EXAMPLE 12

Prepregs were prepared containing the elastomer coated glass fibers prepared in Example 10, following the procedures disclosed in Example 11 above. Epoxy laminates were also prepared in a similar manner. Again, improved shear strength was obtained with the use of the elastomer coated glass fibers. Also, impact toughness increased with the use of the elastomer coated glass fibers.

The elastomer-coated glass fibers were also chopped into one-fourth inch lengths and mixed at 75 grams by weight with 300 grams by weight of Nylon 6, and optionally, 19 grams by weight of Polyanhydride resin PA-18 (a copolymer of 1-octadecene and maleic anhydride.) The mix was extruded using a single-screw Brabender extruded at 240° C. The extrudate was cut into 6" lengths and molded at 250° C. to provide samples for testing. As compared to samples prepared using ordinary glass fibers, the Nylon 6 samples made using the elastomer coated glass fibers demonstrated increased Izod impact strength and increased driven dart impact strength.

I claim:

1. An improved process for preparing uniformly thin and continuous elastomeric coatings on fibers by contacting the fibers with a reactive polymer-containing composition, drying and then curing said composition; wherein said reactive polymer-containing composition is one comprising: (1) a water-dispersed reactive polymer, (2) epoxy resin, and (3) curing agent; wherein said water-dispersed reactive polymer is in a composition comprising (a) 100 parts by weight of a reactive polymer having a Tg value of below 0 C and an average molecular weight of from about 200 to about 10,000, (b)

at least 10 parts by weight of a solvent, (c) a dispersing agent, and (d) at least about 50 parts by weight of water; and wherein said reactive polymer is represented by the following formula:

$$Y_n(PB)$$

wherein Y is either a univalent, reactive radical selected from the group consisting of carboxy groups, amine groups, mercaptan groups, hydroxyl groups, phenolic groups and vinylidene groups or a monomeric unit of the polymeric backbone; n is an integer from 1 to about 10; and PB is a polymeric backbone comprising carbon-carbon or carbon-oxygen linkages; provided that when Y is a monomeric unit of the polymeric backbone, that the polymeric backbone contains vinylidene groups.

2. A process of claim 1 wherein the reactive polymer is a carboxyl-terminated liquid polymer or an amine-terminated liquid polymer which as a polymeric backbone comprised of interpolymerized units of from about 50% to about 99.6% by weight of a diene, up to about 40% by weight of a vinyl nitrile or vinyl aromatic, and up to about 10% by weight of a vinyl acid, and has a carboxyl or an amine content of from about 0.4% to about 10% by weight, all weights based upon the weight of the polymer.

3. A process of claim 2 wherein the solvent is present in the water-dispersed composition in from about 50 to about 500 parts by weight based on 100 parts by weight of the polymer, and the dispersing agent is either an organic acid employed at a level of at least 0.8 carboxyl equivalent of organic acid for every 1.0 amine equivalent, or an amine employed at a level of at least about 0.8 equivalent of base for every 1.0 carboxyl equivalent.

4. A process of claim 3 wherein the fiber employed is graphite fiber.

5. A process of claim 4 wherein the solvent is 2-butoxyethanol.

6. A process of claim 5 wherein the organic acid is lactic acid.

7. A process of claim 5 wherein the base is a tertiary amine.

8. A process of claim 5 wherein the base is selected from the group consisting of dimethylaminoethanol, imidazole, 2-methyl imidazole, and 2-methyl-4-ethyl imidazole.

9. A process of claim 1 wherein the reactive polymer is cured using radiation.

10. A process of claim 1 wherein the reactive polymer is cured by heating in the presence of a curing agent.

11. A process of claim 10 wherein the reactive polymer is a carboxyl-terminated liquid polymer or an amine-terminated liquid polymer which has a polymeric backbone comprised of interpolymerized units of from about 50% to about 99.6% by weight of a diene, up to about 40% by weight of a vinyl nitrite or vinyl aromatic, and up to about 10% by weight of a vinyl acid, and has a carboxyl or an amine content of from about 0.4% to about 10% by weight, all weights based upon the weight of the polymer; and wherein the epoxy resin and curing agent are used in the form of a water dispersion which is admixed with the water-dispersed, reactive polymer composition.

* * * * *